(12) United States Patent
Miyashita et al.

(10) Patent No.: US 7,994,749 B2
(45) Date of Patent: Aug. 9, 2011

(54) MULTIPLE-ROTATION ABSOLUTE-VALUE ENCODER OF GEARED MOTOR

(75) Inventors: Kunio Miyashita, Nagano (JP); Junji Koyama, Nagano (JP); Muneo Mitamura, Nagano (JP); Yasuo Sawamura, Nagano (JP)

(73) Assignee: Harmonic Drive Systems Inc., Tokyo (JP)

( * ) Notice: Subject to any disclaimer, the term of this patent is extended or adjusted under 35 U.S.C. 154(b) by 597 days.

(21) Appl. No.: 11/992,810

(22) PCT Filed: Aug. 8, 2006

(86) PCT No.: PCT/JP2006/315641
§ 371 (c)(1),
(2), (4) Date: Mar. 27, 2008

(87) PCT Pub. No.: WO2007/046182
PCT Pub. Date: Apr. 26, 2007

(65) Prior Publication Data
US 2009/0140731 A1   Jun. 4, 2009

(30) Foreign Application Priority Data
Oct. 18, 2005   (JP) ................................. 2005-302821

(51) Int. Cl.
*G05B 1/06* (2006.01)
(52) U.S. Cl. ....................................... 318/652; 318/638
(58) Field of Classification Search .................. 318/638, 318/652; 324/207.25, 207.11; 310/68 B, 310/68 R
See application file for complete search history.

(56) References Cited

U.S. PATENT DOCUMENTS

| | | | | |
|---|---|---|---|---|
| 4,312,033 A * | 1/1982 | Sweeney et al. | ................ | 700/56 |
| 4,961,035 A * | 10/1990 | Inaba et al. | ................... | 318/600 |
| 5,276,722 A | 1/1994 | Aoki et al. | | |
| 6,664,752 B2 * | 12/2003 | Kanayama et al. | ........... | 318/639 |
| 6,917,034 B2 * | 7/2005 | Iino et al. | ................ | 250/231.13 |
| 7,042,211 B2 | 5/2006 | Kabashima et al. | | |
| 7,375,487 B2 * | 5/2008 | Miyashita et al. | ........... | 318/602 |
| 2004/0246148 A1 | 12/2004 | Kabashima et al. | | |
| 2005/0127906 A1 * | 6/2005 | Miyashita et al. | ....... | 324/207.25 |
| 2006/0186852 A1 * | 8/2006 | Sasaki et al. | ................. | 318/638 |

FOREIGN PATENT DOCUMENTS

| | | |
|---|---|---|
| JP | 5-34105 | 2/1993 |
| JP | 2000-065599 | 3/2000 |
| JP | 2002-372405 | 12/2002 |
| WO | WO 03/036237 A1 | 5/2003 |

OTHER PUBLICATIONS

International Search Report dated Nov. 14, 2006 (2 pages).

* cited by examiner

*Primary Examiner* — Bentsu Ro
*Assistant Examiner* — Kawing Chan
(74) *Attorney, Agent, or Firm* — Flynn, Thiel, Boutell & Tanis, P.C.

(57) ABSTRACT

A multiple-rotation absolute-value encoder of a geared motor, wherein the geared motor (10) reduces the rotational speed of a motor shaft (12) and takes it out from a gear shaft (14) to drive a machine device (15) in an operating range corresponding to two rotations of the gear shaft (14). The multiple-rotation absolute-value encoder (20) fitted to the geared motor (10) is made up of a gear shaft absolute value encoder (30) for detecting the absolute position of the gear shaft (14) and a load side absolute value encoder (50) having a two-pole magnet (51) and a magnetic sensor (52) rotating at a rotational speed reduced to half the rotational speed of the gear shaft (14) through the magnetic gear (40).

4 Claims, 3 Drawing Sheets

MULTIPLE-ROTATION ABSOLUTE-VALUE ENCODER OF GEARED MOTOR

This application is the national stage of International Application No. PCT/JP2006/315641, filed Aug. 8, 2006.

TECHNICAL FIELD

The present invention relates to a multiple-rotation absolute-value encoder of a geared motor suitable for use in a case where the operating range of a load side device driven by the geared motor corresponds to multiple rotations of the gear shaft.

BACKGROUND ART

As shown in FIG. 3, the geared motor comprises a motor 1, and a reduction gear 3 connected to a motor shaft 2. A machine device 5 is driven by a gear shaft 4 of the reduction gear 3. In order to control the positioning of the machine device 5 to be within a previously determined operating range, a motor driver 6 drives and controls the motor 1 on the basis of the rotational position data of the motor obtained from a motor shaft encoder 7 via a signal processing circuit 8, and on the basis of a starting point signal obtained from a starting point sensor 9 that detects a machine starting point, which serves as an operation reference of the machine device 5.

When the geared motor 1 is used to perform positioning control of the machine device 5, the motor 1 must be driven and controlled by the motor driver 6 at start-up so that a state is established wherein the machine device 5 is positioned at the machine starting point. A starting point signal obtained from the starting point sensor 9 of the machine device 5 and a Z-phase signal obtained from the motor shaft encoder 7 are used to establish a state wherein the machine device 5 is positioned at the machine starting point.

For example, a state wherein the machine device 5 is positioned at the machine starting point is established in the following manner. First, the motor 1 is rotatably driven in one direction until the machine device 5 returns to the starting point. After the starting point sensor 9 has detected that the machine device has arrived at the starting point, the motor 1 is made to rotate slowly and the machine device 5 is driven in the same direction until a Z-phase signal is output from the motor shaft encoder 7. The motor 1 is subsequently made to rotate slowly in the reverse direction, and after the machine device 5 has reached the machine starting point, the motor 1 is made to rotate a fixed amount in the opposite direction at a very low speed, so that a state is established wherein the machine device 5 is positioned at the machine starting point.

When the positioning operating range of the machine device 5 corresponds to one rotation of the gear shaft in such a positioning operation, the motor shaft 2 must be made to rotate at no more than the reduction ratio of the reduction gear 3. For example, when the reduction ratio of the reduction gear 3 is 1:50, the motor shaft 2 must be made to rotate as many as 50 times.

In particular, when the positioning operating range of the machine device 5 corresponds to multiple rotations of the gear shaft, the motor shaft 2 must be made to rotate at a higher rate. For example, when the positioning operating range of the machine device 5 corresponds to two rotations (720°) of the gear shaft, and the reduction ratio of the reduction gear 3 is 1:50, then in the positioning operation of the machine device 5 at start-up, the motor shaft 2 must be made to rotate as many as 50×360°×2=36,000°, or the starting point signal from the starting point sensor 9 may not be obtained.

In a positioning operation for positioning at the starting point a load side device associated with a conventional geared motor, the motor shaft thus must be made to rotate multiple times, which is problematic in regard to requiring more time and being inefficient.

DISCLOSURE OF THE INVENTION

An object of the present invention is to provide a multiple-rotation absolute-value encoder in a geared motor that reduces the output rate of rotation of a motor shaft, takes off the output rotation from the gear shaft, and drives a load side device in an operating range corresponding to the multiple rotations of the gear shaft; and that can perform an operation to establish the original position when the device is started or at other times in a brief amount of time, without a starting point sensor being attached to the load side device.

In order to achieve the abovementioned object, according to the present invention, there is provided a multiple-rotation absolute-value encoder of a geared motor wherein an output rotation of a motor shaft is reduced and taken off from a gear shaft, and a load side device is driven in an operating range corresponding to multiple rotations of the gear shaft, the multiple-rotation absolute-value encoder characterized in comprising:

a gear shaft absolute-value encoder having a first two-pole magnet attached to the gear shaft, and a first magnetic sensor for detecting a change in a rotating magnetic field from the first two-pole magnet;

a reduction mechanism for reducing the rotational speed of the gear shaft;

and a load side absolute-value encoder having a second two-pole magnet attached to a reduced-rate output shaft of the reduction mechanism, and a second magnetic sensor for detecting a change in a rotating magnetic field from the second two-pole magnet;

wherein the reduction ratio of the reduction mechanism is set so that the second two-pole magnet rotates in a range of one rotation or less in the operating range of the load side device.

In the present invention, the rotational speed of the gear shaft is reduced and the second two-pole magnet is made to rotate so that the operating range of the load side device corresponds to a range of within one rotation of the second two-pole magnet. Consequently, the absolute operating position of the load side device is determined from an output of the second magnetic sensor that detects the rotating magnetic field of the second two-pole magnet. Therefore, the original position of the load side device can be determined on the basis of the absolute position of the motor shaft, or the original position of the motor shaft obtained from the motor shaft encoder.

Specifically, in the case that a motor shaft encoder is an absolute-value encoder, the angle of rotation of the motor up to the original position of the load side device can be calculated without causing the motor shaft to rotate at start-up. In the case that a motor shaft encoder is an incremental encoder, a Z-phase signal showing the original position is obtained when the motor shaft is made to rotate one rotation at the most, and the angle of rotation of the motor from that position to the original position of the load side device can be calculated. Therefore, the motor shaft need only be made to rotate one rotation maximum at start-up.

The reduction mechanism preferably has a configuration having a magnetic gear comprising a multiple-pole magnet of four poles or more that rotates in association with the rotation of the first two-pole magnet, wherein the second two-pole magnet is attached to the shaft of the magnetic gear. The rotational speed of the gear shaft can be reduced in a non-contact state through the use of the magnetic gear, so that the gear shaft is not subjected to unnecessary loading. Merely increasing the number of magnetized poles of the magnetic gear and not adding any components allows the operating range of the load side device to be set so as to be an angular range of one or fewer rotations of the second two-pole magnet. The load side operating range can thus be accommodated through a very simple configuration.

Using the multiple-rotation absolute-value encoder of the present invention allows the machine starting point of the load side device to be determined without performing an additional start-up operation when the operation of the geared motor is started; therefore, the start-up time can accordingly be reduced.

BEST MODE FOR CARRYING OUT THE INVENTION

A description is provided hereunder of one embodiment of a geared motor comprising a multiple-rotation absolute-value encoder to which the present invention has been applied, with reference being made to the accompanying drawings.

Figure 1A:
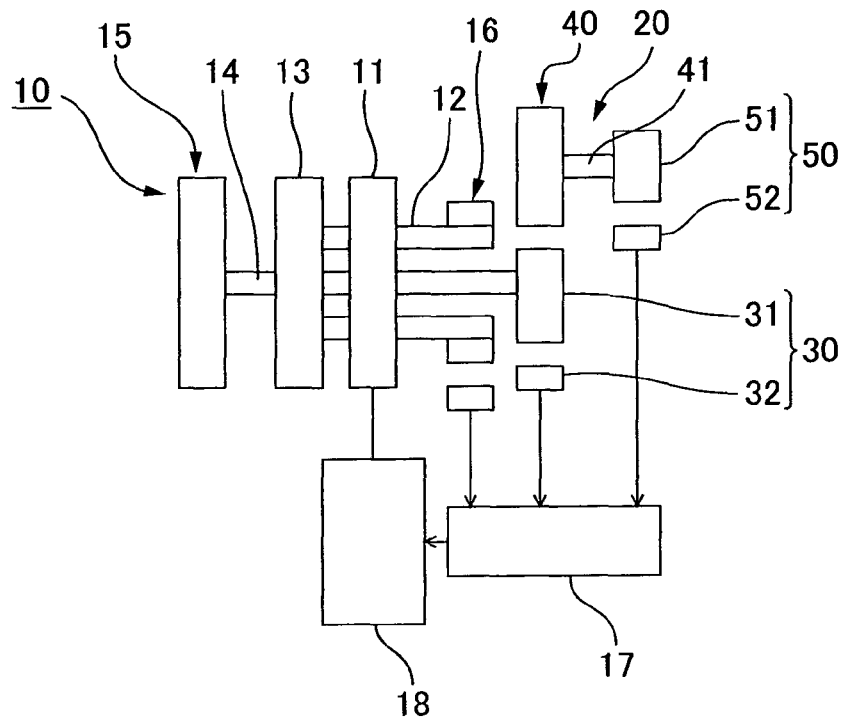
FIG. 1A is a schematic configuration diagram showing a geared motor to which the present invention is applied.
Figure 1B:
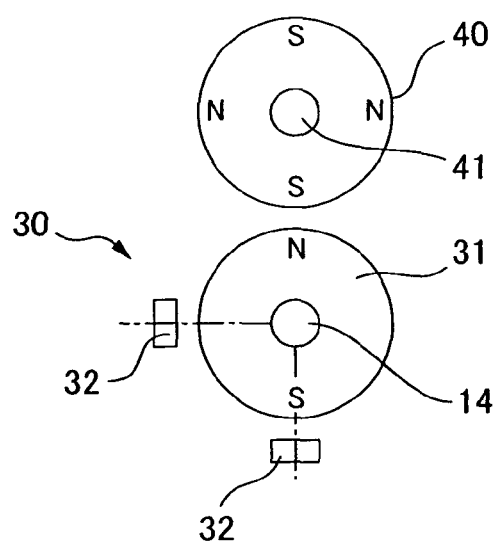
FIG. 1B is a structural diagram showing a magnetic gear and gear shaft absolute-value encoder of a geared motor to which the present invention is applied.

FIG. 1A is a schematic configuration diagram showing the geared motor of the present example, and FIG. 1B is a partial structural diagram of the same. A geared motor 10 comprises a motor body 11 and a reduction gear 13 connected to a motor shaft 12 of the motor body 11. A gear shaft 14 that is an output shaft of the reduction gear 13 is connected to a load side machine device 15. The machine device 15 is positioned and controlled within a prescribed operating range by the geared motor 10.

In the present embodiment, the operating range of the machine device 15 corresponds to the multiple rotations of the gear shaft 14; e.g., the operating range of the machine device 15 corresponds to two rotations (720°) of the gear shaft 14. The reduction ratio of the reduction gear 13 is set at, for example, 1:50. Therefore, 100 rotations of the motor shaft 12 correspond to the operating range of the machine device 15.

The motor shaft 12 is, for example, a hollow shaft, and a motor shaft encoder 16 is attached to a rear end thereof. The motor shaft encoder 16 is, for example, an incremental encoder, and outputs A-, B-, and Z-phase signals. The gear shaft 14 passes through the hollow portion of the motor shaft 12 and extends to the rear side of the motor, and a multiple-rotation absolute-value encoder 20 is attached to the rear end thereof A signal expressing the absolute position of the gear shaft 14 and a signal expressing the absolute position of the load side machine device 15 are output from the multiple-rotation absolute-value encoder 20.

The outputs of the motor shaft encoder 16 and the multiple-rotation absolute-value encoder 20 are supplied to a motor driver 18 after being processed in a signal processor 17. The motor driver 18 drives and controls the motor body 11 and positions the machine device 15 at a target position on the basis of the positional data of the components thus supplied.

The multiple-rotation absolute-value encoder 20 comprises a gear shaft absolute-value encoder 30 for detecting the absolute value of the gear shaft 14. The gear shaft absolute-value encoder 30 comprises a disk-shaped two-pole magnet 31 that is secured coaxially to the rear end of the gear shaft 14, and two magnetic sensors 32 that face an outside peripheral surface of the two-pole magnet 31 across a fixed gap. The magnetic sensors 32 are disposed in positions offset by 90°, as shown in FIG. 1B, and, when the two-pole magnet 31 rotates in association with the gear shaft 14, output a detection signal in the form of a sine wave that has been phase-shifted by 90° for a single cycle of one rotation in response to a change in the resulting rotating magnetic field.

The precision of the gear shaft absolute-value encoder 30 of this configuration enables the number of rotations of the motor shaft 12 (the number of times the motor shaft has rotated up to that point) to be recognized. For example, in a case where the reduction ratio of the reduction gear 13 is 1:50, the angular precision of the gear shaft absolute-value encoder 30 is 7.2° (=360°/50). The absolute position within one rotation of the gear shaft 14 can be ascertained on the basis of the detection signal of the gear shaft absolute-value encoder 30.

The multiple-rotation absolute-value encoder 20 comprises a magnetic gear that functions as a reduction mechanism for reducing and taking off the rotation of the gear shaft 14. The magnetic gear of the present example is a disk-shaped four-pole magnet 40, as shown in FIG. 1B. The four-pole magnet 40 is disposed so as to rotate around a rotational center axis that is parallel to a rotational center axis of the two-pole magnet 31 attached to the gear shaft 14; and the outside peripheral surface of the four-pole magnet 40 faces the outside peripheral surface of the two-pole magnet 31 across a fixed gap. The two-pole magnet 31 and the four-pole magnet 40 are thus magnetically joined, so that when the two-pole magnet 31 rotates together with the gear shaft 14, the four-pole magnet 40 also rotates accordingly. The four-pole magnet 40 makes a half-rotation in the time that the two-pole magnet 31 makes one full rotation, so that the rotation of the gear shaft 14 is reduced by one-half.

The multiple-rotation absolute-value encoder 20 further comprises a load side absolute-value encoder 50 that has a disk-shaped two-pole magnet 51 whose rate of rotation is one-half that of the gear shaft, and magnetic sensors 52 that face the outside peripheral surface of the two-pole magnet 51 across a fixed gap. The two-pole magnet 51 is secured to a rotating shaft 41 of the four-pole magnet 40 in a coaxial state, and rotates integrally with the four-pole magnet 40. The magnetic sensors 52 are disposed, for example, at positions offset by 90° facing the outside peripheral surface of the two-pole magnet 51. When the two-pole magnet 51 rotates, a detection signal in the form of a sine wave that has been phase-shifted by 90° for a single cycle of one rotation in response to a change in the resulting rotating magnetic field is output. The absolute value of one rotation or less of the two-pole magnet 51 can be determined on the basis of the detection signal.

When the gear shaft 14 rotates twice, the two-pole magnet 51 rotates once via a magnetic gear; i.e., one rotation of the two-pole magnet 51 corresponds to the operating range of the load side machine device 15. The absolute position of the machine device 15 can therefore be determined on the basis of the detection signal of the magnetic sensors 52.

In the geared motor 10 of the present example thus configured, the exact position of the machine device 15 can be recognized without an additional start-up operation performed when the machine is started, resulting in a shorter start-up time. Specifically, when the operation of the machine is started, the motor driver 18 drives the motor body 11, and causes the motor shaft 12 to rotate until the first Z-phase signal is output from the motor shaft encoder 16. The absolute position of the machine device 15 can be determined by the signal processor 17 from the detection signal of the load side absolute-value encoder 50 at the time that the Z-phase signal is output. It is also possible to calculate the motor rotational angle from this absolute position to the machine starting point of the machine device 15. As a result, the machine device 15 does not actually have to be made to return to the machine starting point. Therefore, the motor shaft 12 need only be made to rotate no more than one rotation (360°) when the operation of the machine is started.

In a case where the motor shaft encoder 16 is an absolute-value encoder, the original position of the machine device 15 can be recognized without a start-up operation, i.e. without causing the motor shaft 12 to rotate.

Figure 2:
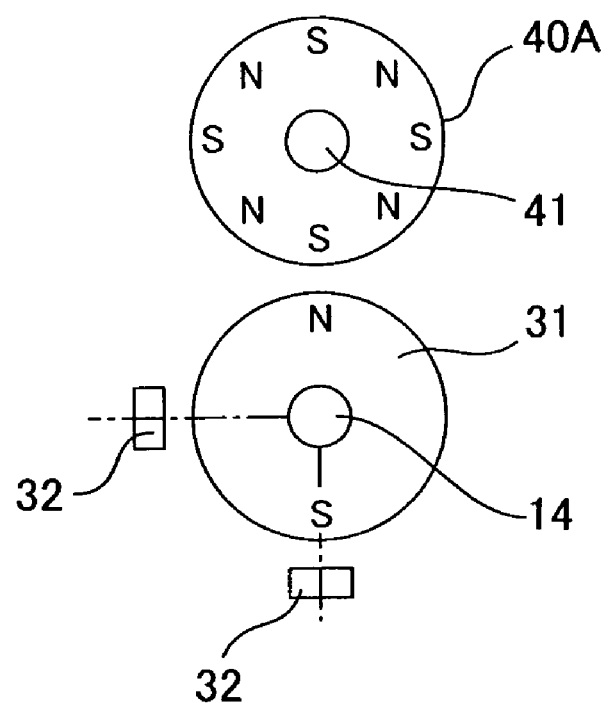
FIG. 2 is a structural diagram showing another example of a magnetic gear.
Figure 3:
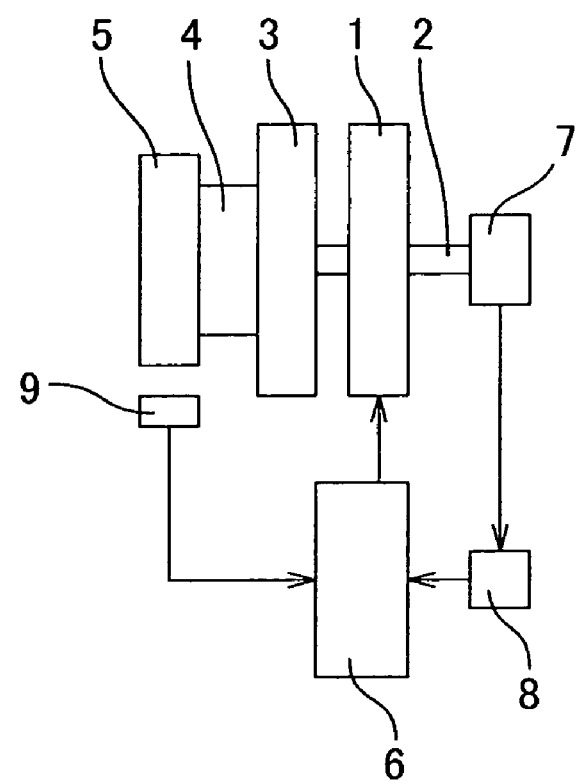
FIG. 3 is a diagram showing a typical geared motor.

The number of magnetized poles of the magnetic gear may be increased when the operating range of the machine device 15 corresponds to more than two multiple rotations of the gear shaft 14. For example, in a case where the operating range of the machine device 15 corresponds to four rotations (1440°) of the gear shaft 14, the reduction ratio of the magnetic gear may be 1:4; i.e. in place of the four-pole magnet 40, an eight-pole magnet 40A may be used for the disk-shaped magnet employed as a magnetic gear, as shown in FIG. 2. In this case, the angular precision of the load side absolute-value encoder 50 is 90° (=360°/4).

A variety of planetary gear reducers and other mechanisms can be used for the reduction gear 13. Examples include wave gear reducers, which have few components and are capable of yielding a high rate of reduction.

In the present example, a magnetic gear has been used as a reduction mechanism for reducing and bringing out the number of rotations of the gear shaft 14; however, a reduction gear may also be employed.

The invention claimed is:

1. A multiple-rotation absolute-value encoder of a geared motor wherein an output rotation of a motor shaft is reduced and taken off from a gear shaft and a load side device is driven in an operating range corresponding to multiple rotations of the gear shaft, the multiple-rotation absolute-value encoder characterized in comprising:
a gear shaft absolute-value encoder having a first two-pole magnet attached to the gear shaft and a first magnetic sensor for detecting a change in a rotating magnetic field from the first two-pole magnet;
a reduction mechanism for reducing the rotational speed of the gear shaft; and
a load side absolute-value encoder having a second two-pole magnet attached to a reduced-rate output shaft of the reduction mechanism and a second magnetic sensor for detecting a change in a rotating magnetic field from the second two-pole magnet;
wherein a reduction ratio of the reduction mechanism is set so that the second two-pole magnet rotates in a range of one rotation or less in the operating range of the load side device.

2. The multiple-rotation absolute-value encoder of a geared motor of claim 1, characterized in that the reduction mechanism is a magnetic gear having a multiple-pole magnet of four poles or more that rotates in association with the rotation of the first two-pole magnet; and
the second two-pole magnet is attached to a shaft of the magnetic gear.

3. The multiple-rotation absolute-value encoder of a geared motor of claim 2, characterized in further comprising a processor for calculating a motor rotation angle up to a machine starting point of the load side device on the basis of a detection signal of a motor shaft encoder attached to a rotating shaft of the motor and on the basis of a detection signal of the load side absolute-value encoder.

4. The multiple-rotation absolute-value encoder of a geared motor of claim 3, characterized in that:
the motor shaft encoder is an incremental encoder; and
once the machine starting point has been established, the processor causes the motor to rotate until a starting point signal is output from the incremental encoder, and calculates a motor rotation angle up to the machine starting point on the basis of an operating position of the load side device as determined by the load side absolute-value encoder at the time that the starting point signal is output.

* * * * *